United States Patent
Matoba

(10) Patent No.: US 10,075,597 B2
(45) Date of Patent: Sep. 11, 2018

(54) IMAGE PROCESSING APPARATUS HAVING FILE SERVER FUNCTION, AND CONTROL METHOD AND STORAGE MEDIUM THEREFOR

(71) Applicant: CANON KABUSHIKI KAISHA, Tokyo (JP)

(72) Inventor: Tatsuo Matoba, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/989,090

(22) Filed: Jan. 6, 2016

(65) Prior Publication Data

US 2016/0119490 A1    Apr. 28, 2016

Related U.S. Application Data

(63) Continuation of application No. 12/959,636, filed on Dec. 3, 2010, now Pat. No. 9,262,112.

(30) Foreign Application Priority Data

Dec. 22, 2009 (JP) .................................. 2009-290964

(51) Int. Cl.
*G06F 3/12* (2006.01)
*H04N 1/00* (2006.01)
*G06F 17/30* (2006.01)

(52) U.S. Cl.
CPC ....... *H04N 1/00204* (2013.01); *G06F 3/1204* (2013.01); *G06F 3/1267* (2013.01);
(Continued)

(58) Field of Classification Search
CPC ............. G06F 3/1267; G06F 17/30203; G06F 3/1204; G06F 3/1273; G06F 3/1285; G06F 17/30091; H04N 1/00204
(Continued)

(56) References Cited

U.S. PATENT DOCUMENTS

| 2004/0130747 | A1 | 7/2004 | Ohishi et al. |
| 2005/0097173 | A1* | 5/2005 | Johns .................. G06F 17/3028 709/206 |

(Continued)

FOREIGN PATENT DOCUMENTS

| CN | 1637739 A | 7/2005 |
| JP | 2005278161 A | 10/2005 |

(Continued)

OTHER PUBLICATIONS

Extended European search Report issued in EP10195112.7, dated Feb. 1, 2013.
(Continued)

*Primary Examiner* — Neil R McLean
(74) *Attorney, Agent, or Firm* — Rossi, Kimms & McDowell LLP

(57) ABSTRACT

An image processing apparatus having a file server function and capable of using a path notification function according to the way in which the image processing apparatus is utilized by a user. The image forming apparatus does not perform a URI notification, if an image data file is stored into a storage unit of the apparatus via the file server function, or if the file is stored via the file server function from an unregistered data storage source, or if the file was not created by an MFP job, or if the file is stored via the file server function and has a registered file type.

13 Claims, 8 Drawing Sheets

(52) U.S. Cl.
CPC .......... *G06F 3/1273* (2013.01); *G06F 3/1285* (2013.01); *G06F 17/30091* (2013.01); *G06F 17/30203* (2013.01); *H04N 2201/001* (2013.01); *H04N 2201/0012* (2013.01); *H04N 2201/0039* (2013.01); *H04N 2201/0094* (2013.01)

(58) Field of Classification Search
USPC ....................................................... 358/1.15
See application file for complete search history.

(56) References Cited

U.S. PATENT DOCUMENTS

| | | | |
|---|---|---|---|
| 2005/0166184 A1* | 7/2005 | Takao | G06F 9/451 717/117 |
| 2005/0210031 A1 | 9/2005 | Kasatani | |
| 2005/0257052 A1* | 11/2005 | Asai | H04L 63/105 713/166 |
| 2006/0066895 A1* | 3/2006 | Tonami | H04N 1/32395 358/1.15 |
| 2006/0282466 A1 | 12/2006 | Yasukaga et al. | |
| 2007/0146789 A1* | 6/2007 | Mima | B41J 11/485 358/1.16 |
| 2007/0255632 A1* | 11/2007 | Hatano | G06Q 10/087 705/28 |
| 2008/0083016 A1 | 4/2008 | Itoh | |
| 2008/0239374 A1* | 10/2008 | Yamaguchi | H04N 1/2179 358/1.15 |
| 2009/0231637 A1* | 9/2009 | Kemmochi | H04N 1/00206 358/474 |
| 2010/0328723 A1 | 12/2010 | Kamekawa | |

FOREIGN PATENT DOCUMENTS

| | | |
|---|---|---|
| JP | 2006101205 A | 4/2006 |
| JP | 2006135496 A | 5/2006 |
| JP | 2007080200 A | 3/2007 |
| JP | 2009239743 A | 10/2009 |
| JP | 2009245418 A | 10/2009 |
| JP | 2009267658 A | 11/2009 |

OTHER PUBLICATIONS

Office Action issued in U.S. Appl. No. 12/959,636, dated Mar. 21, 2013.
Office Action issued in KR10-2010-0127849, dated Mar. 26, 2013.
Office Action issued in U.S. Appl. No. 12/959,636, dated Nov. 19, 2013.
Office Action cited in CN201010615224.5, dated Apr. 16, 2014.
Office Action issued in U.S. Appl. No. 12/959,636, dated Sep. 5, 2014.
Office Action issued in JP2013-252164, dated Nov. 18, 2014.
Office Action issued in U.S. Appl. No. 12/959,636, dated Mar. 19, 2015.
Search Report issued in EP10195112.7, dated Oct. 29, 2015.

\* cited by examiner

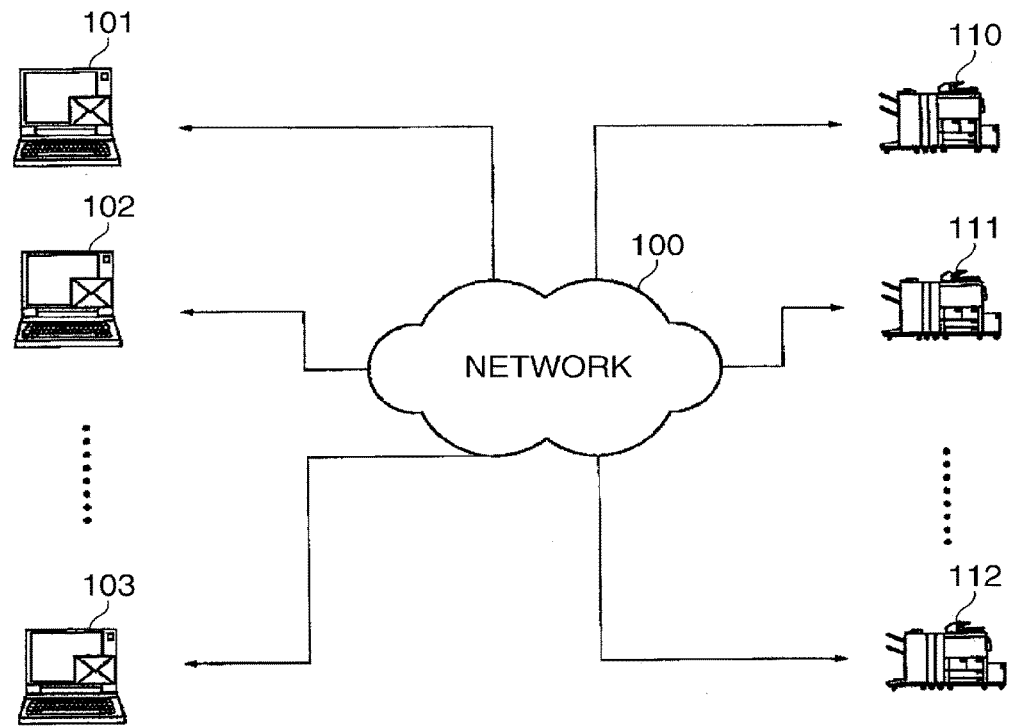
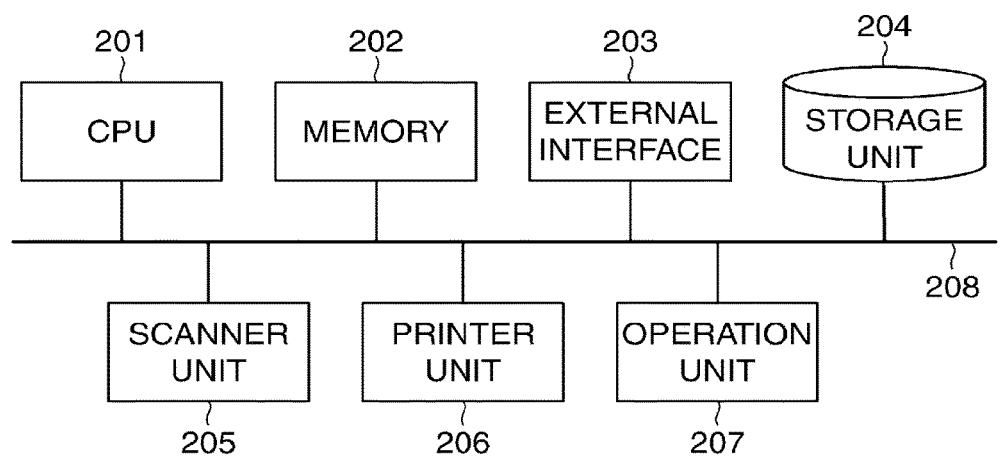

IMAGE PROCESSING APPARATUS HAVING FILE SERVER FUNCTION, AND CONTROL METHOD AND STORAGE MEDIUM THEREFOR

BACKGROUND OF THE INVENTION

Field of the Invention

The present invention relates to an image processing apparatus and a control method and a storage medium therefor, which are capable of notifying, in a case where a file is stored into the image processing apparatus, a path for accessing the file from the outside.

Description of the Related Art

An image processing apparatus having a box function for image data management is known, and some box function has a function of notifying, in a case where image data is stored into an image processing apparatus, an external public path (e.g., a URI (uniform resource identifier)) for accessing the image data from the outside.

As for the URI notification function, a document registration system has been proposed in Japanese Laid-open Patent Publication No. 2006-135496 that includes a document management system which cooperates with an image processing apparatus via a network. This document registration system is configured, in a case where a scan job file containing URI transmission information is stored from the image processing apparatus into the document management system, to notify by e-mail of a path in the http (hypertext transfer protocol) format for accessing the scan job file.

An image processing apparatus having a file management function (file management system) that manages documents, images, etc., especially, one having a file management system that has a file server function by which an external apparatus (e.g., a PC) is enabled to access a file in the image processing apparatus, entails the following problem.

If a file management system of an image processing apparatus has the file server function and is compatible to SMB (server message block), CIFS (common internet file system), WebDAV (web-based distributed authoring and versioning), or the like, the file management system can be used as an ordinary file server a network-connected PC. As a consequence, ordinary files stored from the PC and image data files resulting from scan jobs, print jobs, transmission jobs, etc. in the image processing apparatus are mixedly stored in the file management system.

Under the above circumstance, if the URI notification function of notifying a path for accessing an image data file stored in the image processing apparatus to a predetermined destination is introduced, the URI notification is performed for any file stored from the network-connected PC to the image processing apparatus through the file server function, so that application software (hereinafter referred to as the application) running on the PC becomes able to directly open and execute a file stored in the image processing apparatus.

Some application running on the PC creates a backup file, a hidden file, and a control file, as a temporary file. Also for such a temporary file, the conventional URI notification function performs the URI notification. Accordingly, a notification unnecessary to be received by a user is delivered, resulting in user's inconvenience.

In the case of applying the URI notification technique disclosed in Japanese Laid-open Patent Publication No. 2006-135496 to a file management system of an image processing apparatus having the file server function, it is not possible to control the URI notification function to be enabled or disabled for various data storage methods that can be achieved by the file management system.

For example, the technique disclosed in Japanese Laid-open Patent Publication No. 2006-135496 cannot control whether the URI notification should be performed when an image data file is loopback stored into the image processing apparatus via the file server function of the apparatus by an embedded application of the image processing apparatus. With this technique, it is also not possible to control the image processing apparatus such that the URI notification is not performed for a temporary file created by the application running on the PC.

SUMMARY OF THE INVENTION

The present invention provides an image processing apparatus and a control method and a storage medium therefor, which are capable of using a path notification function according to the way in which the image processing apparatus having a file server function is utilized.

According to a first aspect of this invention, there is provided an image processing apparatus including a storage unit and having a file server function of enabling an external apparatus to access, via a network, a file stored in the storage unit, which comprises a detection unit configured to detect a file being stored into the storage unit, a setting unit configured to set a notification destination of a path for use by the external apparatus to access the file stored in the storage unit, a holding unit configured to hold a notification condition for determining whether the path should be notified in a case where the detection unit detects that the file is stored into the storage unit, and a control unit configured, in a case where the detection unit detects that the file is stored into the storage unit, to perform control to notify the path to the notification destination set by the setting unit if the notification condition is satisfied, and perform control not to notify the path if the notification condition is not satisfied.

According to a second aspect of this invention, there is provided a control method for the image processing apparatus described in the first aspect.

According to a third aspect of this invention, there is provided a storage medium storing a program for executing the control method described in the second aspect.

With this invention, a path for accessing a file stored in the storage unit is not notified even when the file being stored into the storage unit is detected, if the path notification condition is not satisfied. It is therefore possible to use the path notification function according to the way in which the image processing apparatus having the file server function is utilized.

Further features of the present invention will become apparent from the following description of an exemplary embodiment with reference to the attached drawings.

BRIEF DESCRIPTION OF THE DRAWINGS

FIG. 1 is a schematic view showing the overall construction of an image processing system including image forming apparatuses as image processing apparatuses according to one embodiment of this invention;

FIG. 2 is a block diagram showing the main hardware construction of each image forming apparatus;

DESCRIPTION OF THE EMBODIMENTS

Figure 3:
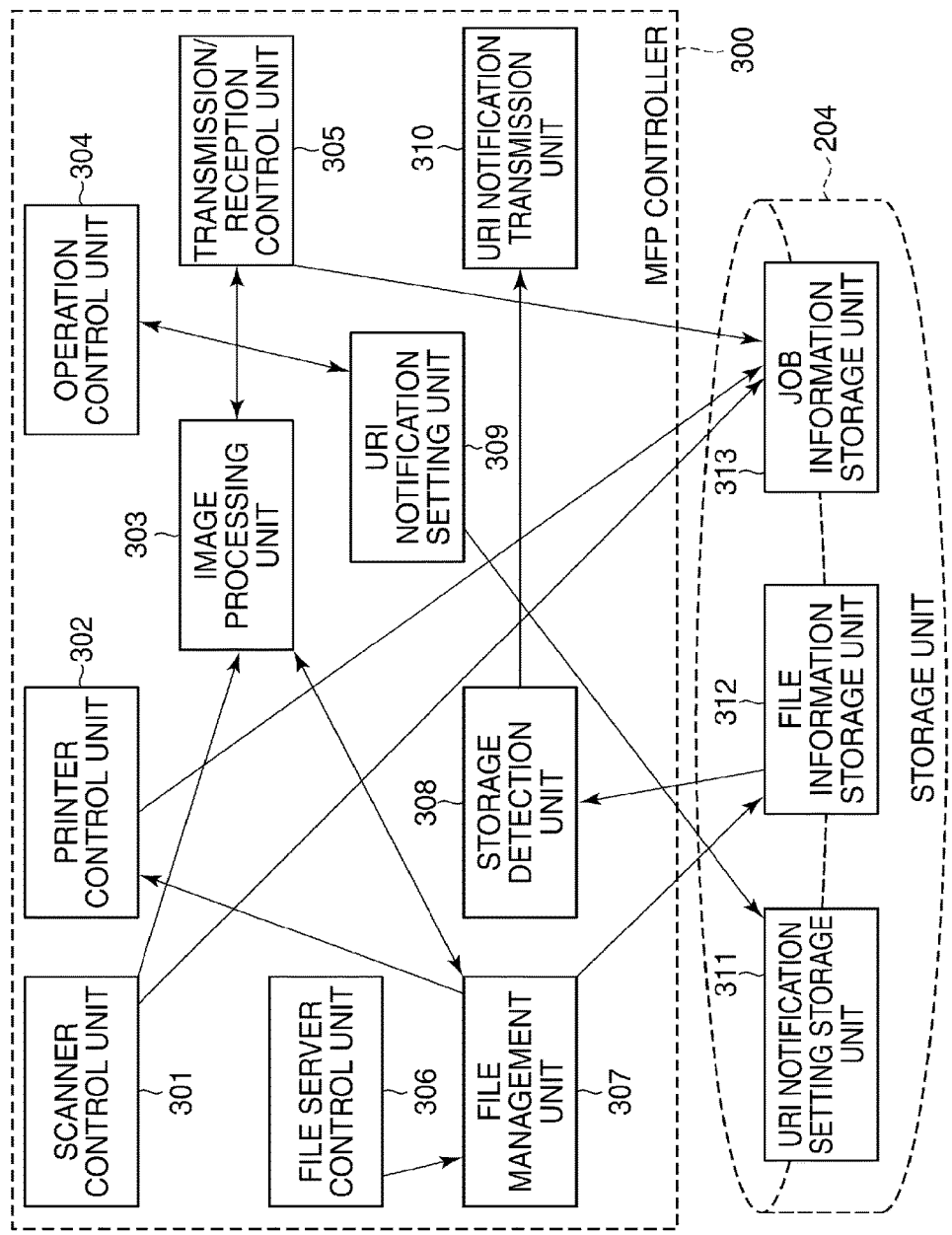
FIG. 3 is a block diagram showing the software construction of an MFP controller and a storage unit of the image forming apparatus.

The present invention will now be described in detail below with reference to the drawings showing a preferred embodiment thereof.

FIG. 1 schematically shows the overall construction of an image processing system including image processing apparatuses according to one embodiment of this invention.

As shown in FIG. 1, the image processing system includes user PCs 101, 102, and 103 and image forming apparatuses 110, 111, and 112, which are connected for communication with one another via a network 100. The user PCs are each an example of an external apparatus and the image forming apparatuses are each an example of an image processing apparatus. In this embodiment, the user PCs 101 to 103 have the same construction as one another and the image forming apparatuses 110 to 112 have the same construction as one another. In the following, the user PC 101 and the image forming apparatus 110 will be described by way of example. It should be noted that the number of the user PCs and the number of the image forming apparatuses are not limited to those in FIG. 1. The network 100 is implemented by a LAN (local area network) in the illustrated example, but can be implemented by other network system such as the Internet.

The user PC 101 has a network interface connected to the network 100 for exchanging various data between the PC 101 and the network 100. The user PC 101 is implemented by an ordinary information processing apparatus having a CPU, ROM, RAM, HDD, etc. The user PC 101 has an ordinary browser program for browsing, via the network 100, a file or a folder stored in a server (not shown), and an ordinary mail application for transmitting and receiving an e-mail.

The image forming apparatus 110 has a network interface connected to the network 100 for exchanging various data between the apparatus 110 and the network 100. In this embodiment, the image forming apparatus 110 is implemented by an MFP (multi-function peripheral). The image forming apparatus 110 has a file server function that enables an external apparatus to access, via the network 100, an image data file stored in a storage unit (denoted by 204 in FIG. 2), and has an external public path (URI) notification function for notifying a user that an image data file has been stored into the storage unit.

It should be noted that the image forming apparatuses of the image processing system can be a combination of one or more MFPs each having plural functions and one or more SFPs (single function peripherals) each having a printing function alone.

FIG. 2 shows in block diagram the main hardware construction of the image forming apparatus 110.

The image forming apparatus 110 shown in FIG. 2 has various functions such as a scan function, print function, copy function, transmission/reception function, and box function for storing image data files in a storage area of the image forming apparatus for reprint purpose, etc. The image forming apparatus 110 includes a CPU 201, memory 202, external interface 203, storage unit 204, scanner unit 205, printer unit 206, operation unit 207, and internal bus 208.

The CPU 201 for controlling operation of the entire image forming apparatus 110 reads and executes a program stored in the memory 202 or the storage unit 204 to give instructions to various parts of the image forming apparatus to thereby realize operations of scanning, printing, transmission, reception, etc. The CPU 201 controls processing modules of an MFP controller 300 (FIG. 3) of the image forming apparatus 110 to perform a process shown in FIGS. 8A and 8B.

The memory 202 has a ROM that stores various programs having program codes and executed by the CPU 201, and a RAM that temporarily stores data necessary for execution of control. By executing the various programs, it is possible to realize functions of the processing modules of the MFP controller 300 (i.e., a scanner control unit 301, printer control unit 302, image processing unit 303, operation control unit 304, transmission/reception control unit 305, file server control unit 306, image data file management unit 307, storage detection unit 308, URI notification setting unit 309, and URI notification transmission unit 310, which are shown in FIG. 3). The external interface 203 exchanges information, via the network 100, with the external image forming apparatuses 111, 112 and the user PCs 101, 102, and 103.

The storage unit 204 is implemented by a nonvolatile memory such as a hard disk, and stores image data files created by the image forming apparatus 110 and control information and setting information. The storage unit 204 includes a URI notification setting storage unit 311, image data file information storage unit 312, and job information storage unit 313, which are shown in FIG. 3. Data reading/writing from and to the storage unit 204 is performed via the memory 202. The programs can be stored in the storage unit 204 instead of storing them in the ROM of the memory 202.

The scanner unit 205 irradiates light onto an original placed on an original table, optically reads an original image, and converts the original image into an electrical signal, thereby creating image data. The printer unit 206 includes a laser exposure device, image forming device, fixing device, and sheet feed/conveyance device (none of which are shown), and forms the image data on a recording sheet. The operation unit 207 has a touch panel and keys used by the user to input an operation instruction, etc. to the image forming apparatus 110, and has a display unit for displaying various screens. The internal bus 208 connects various parts of the image forming apparatus 110. Image data transfer is performed through the internal bus 208, and transmission/reception of instructions and setting values is also performed through the internal bus 208 between the various parts of the image forming apparatus 110.

FIG. 3 shows in block diagram the software construction of the MFP controller 300 and the storage unit 204 of the image forming apparatus 110.

As previously described, the MFP controller 300 includes the scanner control unit 301, printer control unit 302, image processing unit 303, operation control unit 304, transmission/reception control unit 305, file server control unit 306, image data file management unit (hereinafter, referred to as the file management unit) 307, storage detection unit 308, URI notification setting unit 309, and URI notification transmission unit 310. The storage unit 204 includes the URI notification setting storage unit 311, image data file information storage unit (hereinafter, referred to as the file information storage unit) 312, and job information storage unit 313.

The processing modules 301 to 310 operate as apart of an application or a program executed by the CPU 201. The storage units 311 to 313 of the storage unit 204 store the program and various data for the MFP controller 300, and are implemented by a nonvolatile hard disk, memory, or the like. Information stored in the storage units 311 to 313 can be accessed by operating a particular key or under a particular condition. Arrows in FIG. 3 indicate data flow or process flow.

The scanner control unit 301 drives the scanner unit 205 according to an instruction from the CPU 201. The scanner unit 205 reads an original placed on the original table, stores the read image data into the memory 202, and gives the image processing unit 303 an instruction to perform image processing on the read image data.

According to an instruction from the CPU 201, the printer control unit 302 acquires an image data file from the memory 202 or the file information storage unit 312 via the file management unit 307, and drives the printer unit 206. The printer unit 206 having the laser exposure device, image forming device, fixing device, and sheet feed/conveyance device (none of which are shown) print-outputs an image on a recording sheet.

The image processing unit 303 operates according to an instruction from the CPU 201, and performs image processing, image quality improvement processing, and processing to analyze and convert image data (which is stored into the memory 202 by the scanner control unit 301 or the transmission/reception control unit 305) in accordance with an instruction given by the user via the operation control unit 304. The image processing unit 303 also analyses and converts an image data file stored into the file information storage unit 312 by the file management unit 307. The converted image data is printed under the control of the printer control unit 302, or transmitted by the transmission/reception control unit 305.

The operation control unit 304 operates according to an instruction from the CPU 201 and controls the operation unit 207. Information given by the user by operating the operation unit 207 is delivered to various parts of the image forming apparatus 110 to operate the apparatus 110.

The transmission/reception control unit 305 operates according to an instruction from the CPU 201 and controls a transmission/reception job. When a facsimile application, an e-mail application, or the like is operated by the user via the operation unit 207, the transmission/reception control unit 305 acquires an image data file from the memory 202 or the storage unit 204 and transmits the acquired image data file to the outside via the external interface 203. The transmission/reception control unit 305 performs control to receive an image data file from the outside and store the received file into the storage unit 204.

The file server control unit 306 provides a file server function that enables the external apparatuses (image forming apparatuses 111, 112 and user PCs 101 to 103) to access the image forming apparatus 110 via the network 100. The file server control unit 306 operates according to an instruction from the CPU 201, is compatible to protocols such as HTTP, FTP, SMB, and WebDAV, and performs data control according to the protocol used.

The control executed by the file server control unit 306 and the file management unit 307 makes it possible to perform reading/writing access from the outside via the network 100 to an image data file or a folder managed by the file information storage unit 312.

In most cases, a conventional image forming apparatus can read an image data file, etc. from the outside using a control unit similar to the file server control unit 306, but cannot write an image data file, etc. from the outside.

On the other hand, the image forming apparatus 110 not only can read an image data file, etc. from the outside, but also can write an image data file, etc. from the outside using the file server control unit 306. In other words, the image forming apparatus 110 serves as a file server that can be accessed from the outside. The image forming apparatus 110 also has a URI notification function of notifying the user (user PC in this embodiment) of an image data file being stored into the image forming apparatus 110.

The file management unit 307 operates according to an instruction from the CPU 201, and manages registration of image data file information into the file information storage unit 312, updating of image data file information in the unit 312, extraction of image data file information from the unit 312, etc.

Under the intermediary control by the file management unit 307, the printer control unit 302 reads an image data file from the file information storage unit 312, the scanner control unit 301 stores into the storage unit 312 an image data file stored in the memory 202, the transmission/reception control unit 305 reads and writes an image data file from and into the storage unit 312, and the file server control unit 306 enables reading/writing access from the outside to an image data file stored in the storage unit 312.

The storage detection unit 308 operates according to an instruction from the CPU 201. When there has occurred an event to store an image data file into the file information storage unit 312 or update an image data file in the unit 312 or delete an image data file from the unit 312, the storage detection unit 308 notifies occurrence of the event and event related information in an image data file information table 500 (FIG. 5) to a preregistered destination.

In this embodiment, when an image data file is stored from the scanner control unit 301 or the file server control unit 306 into the storage unit 312, the storage detection unit 308 notifies the URI notification transmission unit 310 of occurrence of the storage event and storage event related information (image data file related information) in the file information table 500. If a URI notification condition is set in the URI notification setting unit 309, the detection unit 308 notifies the transmission unit 310 of occurrence of the storage event and the storage event related information only when the URI notification condition is satisfied.

Figure 4:
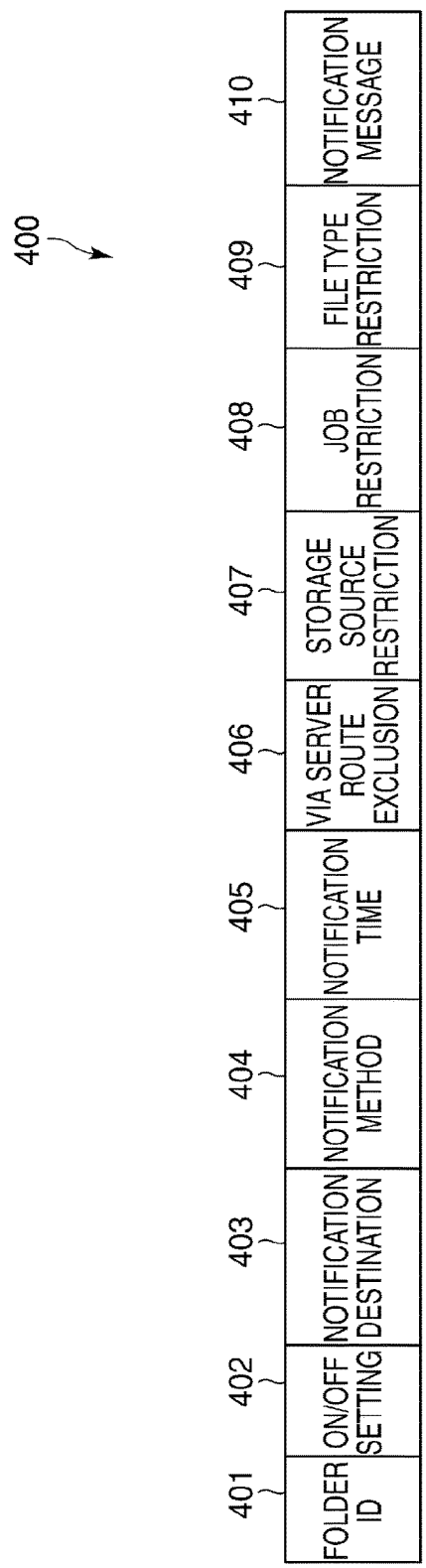
FIG. 4 is a view showing an example construction of a URI notification setting table stored in the storage unit.

The URI notification setting unit 309 sets the URI notification condition, etc. The setting unit 309 operates according to an instruction from the CPU 201, and sets URI notification-related setting information according to a user's operation on a URI notification setting screen 700 (FIG. 7) displayed on the touch panel of the operation unit 207. The information set by the setting unit 309 is held in a URI notification setting table 400 (FIG. 4).

Figure 7:
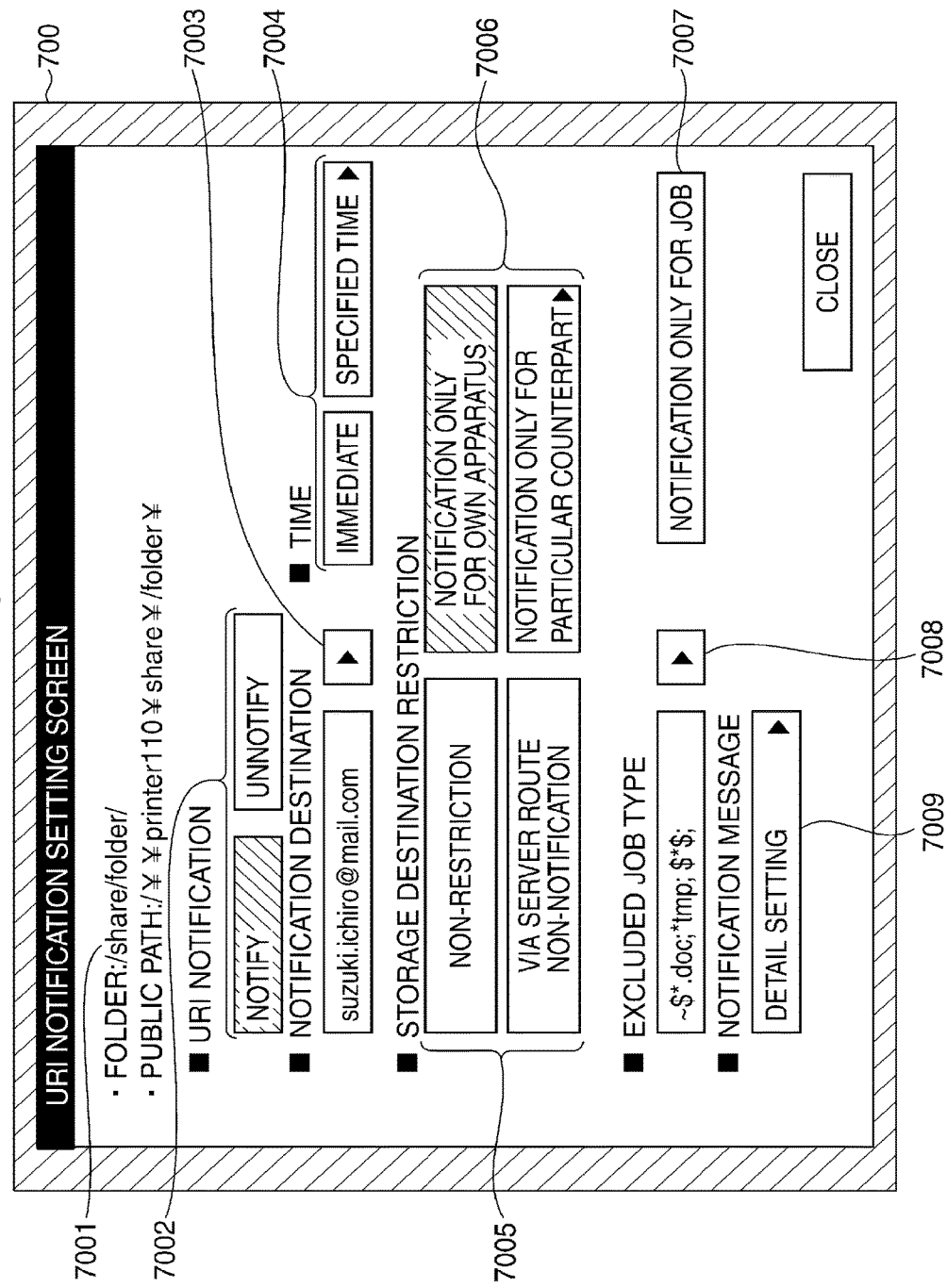
FIG. 7 is a view showing an example of a URI notification setting screen displayed on an operation unit of the image forming apparatus.

FIG. 7 shows an example of the URI notification setting screen 700 displayed on the operation unit 207 of the image forming apparatus 110.

As shown in FIG. 7, various buttons and input fields for inputting information related to a to-be-set folder is displayed on the setting screen 700. After the information related to the to-be-set folder is set, the set information is stored into the URI notification setting table 400 (FIG. 4).

In a folder path information field 7001 shown in FIG. 7, there are displayed information about a path to the to-be-set folder and information about an external public path (URI) notified in a case where a URI notification is performed. In the illustrated example, a folder path "/share/folder/" and an external public path "¥¥printer001¥share¥folder¥" are displayed in the field 7001. A letter string "printer001" in the external public path is a server name of the image forming apparatus 110. The folder path "/share/folder/" and the external public path "¥¥printer001¥share¥folder¥" indicate the same folder as each other.

URI notification ON/OFF selection buttons 7002 are used to set whether the URI notification should be performed when an image data file is stored into the folder, which is indicated in the folder path information field 7001. A notify button is depressed, if the URI notification should be performed. An unnotify button is depressed, if the URI notification should not be performed. The setting content by the ON/OFF selection buttons 7002 is reflected to an ON/OFF setting field 402 in the URI notification setting table 400 under the control of the operation control unit 304 and the URI notification setting unit 309.

A URI notification destination setting button 7003 is depressed to input information about a destination of the URI notification performed when an image data file is stored into the folder indicated in the folder path information field 7001. When the button 7003 is depressed, a notification destination input screen (not shown) for setting the destination information is displayed. The destination information represents, e.g., an e-mail address for use when the URI notification is performed by e-mail. In the illustrated example, a mail address "suzuki.ichiro@mail.com" is set as the destination information and displayed in a notification destination field of the screen 700. The destination information is reflected to a notification destination field 403 of the URI notification setting table 400 under the control of the operation control unit 304 and the URI notification setting unit 309.

URI notification time setting buttons 7004 are used to set a time to perform the URI notification after the storage detection unit 308 detects that an image data file is stored into the folder indicated in the folder path information field 7001. If an immediate button is depressed, an immediate notification setting is established to perform the URI notification immediately after the storage detection unit 308 detects storage of image data file. When a specified time button is depressed, there is displayed a specified time notification setting screen (not shown) on which a specified time notification setting can be established to collectively notify, at a specified time, pieces of information about image data files stored before the specified time is reached.

The set notification time information is reflected to a notification time field 405 of the URI notification setting table 400 under the control of the operation control unit 304 and the URI notification setting unit 309.

"Via file server route exclusion setting" buttons 7005 are used to make a setting, according to image data file storage route, to determine whether the URI notification should be performed when an image data file is stored into the folder indicated in the folder path information field 7001. If a "via server route non-notification" button is depressed, the setting is established so as not to perform the URI notification when the file server control unit 306 stores an image data file into the file information storage unit 312 via the external interface 203 using the file server function provided by the image forming apparatus 110.

On the other hand, if a non-restriction button is depressed, the setting is established to perform the URI notification when an image data file is stored into the storage unit 312 by an MFP job or via the file server function. The set information is reflected to a "via server route exclusion" field 406 of the URI notification setting table 400 under the control of the operation control unit 304 and the URI notification setting unit 309.

"Storage source restriction setting" buttons 7006 are used to make a setting according to the network address of storage source of image data file to determine whether the URI notification should be performed when an image data file is stored into the folder indicated in the folder path information field 7001. If a "notification only for own apparatus" button is depressed, the setting is established so as not to perform the URI notification when an image data file is stored into the image forming apparatus 110 from the outside via the network 100.

On the other hand, if a "notification only for particular counterpart" button is depressed, a URI notification object storage source setting screen (not shown) is displayed on the operation unit 207. If one or more network addresses of a desired one or ones of the user PCs 101 to 103 and the image forming apparatuses 110 to 112 are set on the setting screen, the setting is established to perform the URI notification only when an image data file is stored into the image forming apparatus 110 from any of the apparatuses each having the registered address. The set information is reflected to a storage source restriction field 407 of the URI notification setting table 400 under the control of the operation control unit 304 and the URI notification setting unit 309.

In the above example, each storage source apparatus is identified based on the IP address of a transmission source of a received packet. Alternatively, the storage source apparatus can be identified based on the IP address of a destination of a received packet. For example, it is possible to configure that the own apparatus (i.e., the image forming apparatus 110) is identified as the storage source when a packet is processed for which a loopback address of 127.0.0.1 is specified as the destination IP address.

A "job data restriction setting" button 7007 (a "notification only for job" button in the illustrated example) is used to make a setting to perform the URI notification when an image data file is stored into the folder indicated in the folder path information field 7001 only if the image data file was created by an MFP job. If the "notification only for job" button 7007 is depressed, the setting is established to perform the URI notification only when there is stored an image data file created by an MFP job (such as a print job, scan job, storage job, or transmission/reception job) in the image forming apparatus 110 or other image forming apparatus 111 or 112.

To determine whether the stored image data file was created by an MFP job, it is determined whether the storage source of the image data file is any of the image forming apparatuses 110 to 112 or any of the user PCs 101 to 103 based on information stored in a storage source field 507 of a record for the image data file in the image data file information table (hereinafter, referred to as the file information table) 500 shown in FIG. 5. If it is determined that the storage source is any of the image forming apparatuses, a job history table 600 (FIG. 6) in the storage source apparatus is narrowed down in terms of job execution time and data size based on information stored in an "update date and time" field 503 and a file size field 504 of the record for the image data file in the file information table 500.

As a result of the narrowing down, if an MFP job coincident with the image data file is found from the job history table 600 in the storage source apparatus, it is determined that the image data file was created by the MFP job. The information set by depressing the job data restriction setting button 7007 is reflected to a job restriction field 408 of the URI notification setting table 400 under the control of the operation control unit 304 and the URI notification setting unit 309.

A "URI notification exclusion file setting" button 7008 is used to make a setting, according to the file type of the stored image data file, to determine whether the URI notification should be performed when an image data file is stored into the folder indicated in the folder path information field 7001. If the setting button 7008 is depressed, a URI notification exclusion file setting screen (not shown) is displayed on the operation unit 207. On the setting screen, it is possible to set one or more file names for which the URI notification should not be performed.

In a case, for example, that a temporary file automatically created by the application running on the user PC 101 has a file extension of tmp, it is possible by inputting a wildcard name "*.tmp" to make a setting so as not to perform the URI notification when a temporary file is stored. The set information is reflected to a file type restriction field 409 of the URI notification setting table 400 under the control of the operation control unit 304 and the URI notification setting unit 309.

A notification message setting button 7009 (a detail setting button in the illustrated example) is used to set the content of a URI notification message, which is notified to the user when an image data file is stored into the folder indicated in the folder path information field 7001. If the detail setting button 7009 is depressed, a notification message detail setting screen (not shown) is displayed on the operation unit 207, and the message to be notified can be set thereon. The message includes information (e.g., ¥¥printer110¥share¥folder¥sample.jpg) in an external public path field 506 for the stored image data file in the file information table 500.

The user is able to easily reach the image data file by using a file browser application or the like to access the external public path contained in a received URI notification message. The setting on the notification message detail setting screen is reflected to a notification message field 410 of the URI notification setting table 400 under the control of the operation control unit 304 and the URI notification setting unit 309.

Referring to FIG. 3 again, the URI notification transmission unit 310 operates according to an instruction from the CPU 201, and transmits a URI notification message. In a case that the storage detection unit 308 detects that an image data file is stored and the URI notification condition set in the URI notification setting table 400 is satisfied, the storage detection unit 308 notifies the URI notification transmission unit 310 of occurrence of an image data file registration event and information in the file information table 500 about the image data file.

The URI notification transmission unit 310 transmits the information in the external public path field 506 for the image data file in the file information table 500 and the content in the notification message field 410 for the image data file in the URI notification setting table 400 to the destination specified in the notification destination field 403 by the notification method specified in the notification method field 404 when the time specified in the notification time field 405 in the table 400 is reached.

Pieces of information about the URI notification setting for the image forming apparatus 110 are held in the URI notification setting storage unit 311. These pieces of information include folder IDs of folders (which are objects of the URI notification setting), ON/OFF settings, notification destinations, notification methods, notification times, notification conditions, and notification messages.

The notification conditions are such that the URI notification is not performed in cases that an image data file is stored via the file server (file server function), that an image data file is stored via the file server from a non-registered storage source (i.e., a storage source other than the particular storage sources), that an image data file is not stored as an MFP job for scanning, printing, transmission/reception, storage, etc. (i.e., image data file was not created by an MFP job), and that an image data file is stored via the file server and the file type of the image data file coincides with any of the registered file types.

FIG. 4 shows an example construction of the URI notification setting table 400 previously mentioned and stored in the URI notification setting storage unit 311 of the image forming apparatus 110.

The URI notification setting table 400 includes one or more folders (records), which are collectively illustrated in FIG. 4. In each folder, the folder ID field 401 stores an identifier (or a folder path) that uniquely identifies the folder.

The ON/OFF setting field 402 stores information that represents whether the URI notification should be performed when an image data file is stored into the folder represented by the identifier in the folder ID field 401. The notification destination field 403 stores information about (e.g., an e-mail address of) a destination of the URI notification. The notification method field 404 stores information that represents a URI notification method (e.g., notification by e-mail or by a predetermined protocol message).

The notification time field 405 stores information that represents a time at which the URI notification should be performed. As examples of the URI notification, there can be mentioned an immediate notification that is performed simultaneously when an image data file is stored and a time notification that is performed at a predetermined particular time in a case where one or more image data files, if any, have been stored between the preceding notification time and the particular time. The "via server route exclusion" field 406 stores information that represents whether the URI notification should be performed when an image data file is stored via the file server function into the image forming apparatus 110 from the outside through the network 100.

The storage source restriction field 407 stores information (e.g., one or more network addresses) that represents one or more particular external apparatuses (the user PCs 101 to 103 and the image forming apparatuses 111, 112 in this embodiment) in a case where the URI notification is performed only when an image data file is stored via the file server function into the image forming apparatus 110 from any of the particular external apparatuses through the network 100.

By setting the network addresses (such as ID addresses) of the external apparatuses in the storage source restriction field 407, it becomes possible to perform the URI notification only when an image data file is stored via the file server function into the image forming apparatus 110 from any of the external apparatuses having the registered addresses. The URI notification is not performed, if an image data file is stored into the image forming apparatus 110 from a non-registered external apparatus.

The job restriction field 408 stores information that represents whether the URI notification should be performed when an image data file is stored only in a case where the image data file is associated with an MFP job in the image forming apparatus.

The file type restriction field 409 registers information that represents one or more types of image data files (file types) for which the URI notification should not be performed. For example, a file name pattern such as "*.tmp" or "~$*.doc" of temporary files automatically created by the application running on the user PC 101 is registered in the file type restriction field 409. In accordance with the registration, the URI notification is not performed when a file having a file name coincident with the registered file name pattern is stored into the image forming apparatus 110.

As another example of file type restriction, there is a case where the URI notification is not performed, if the file size is less than 1024 bytes or if the image data file has a hidden file attribute.

The notification message field 410 stores a template of URI notification message. The URI notification message includes an external public path (e.g., file://server/share/folder/sample.jpg) to the stored image data file. The user of the user PC 101 who received the URI notification message by e-mail becomes able to easily access the image data file stored in the image forming apparatus 110.

Referring to FIG. 3 again, the file information storage unit 312 registers pieces of information about image data files managed by the image forming apparatus 110. These pieces of information about image data files include image data file IDs, file names, update dates and times, file sizes, folder paths, external public paths, storage sources, and image data.

Figure 5:
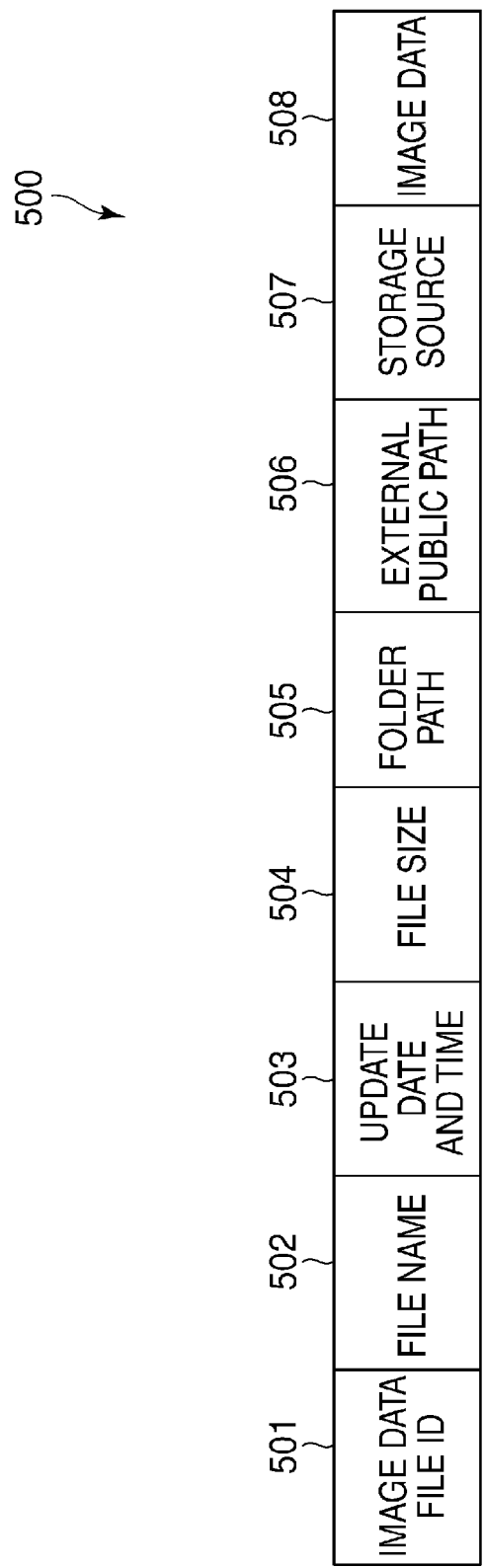
FIG. 5 is a view showing an example construction of an image data file information table stored in the storage unit.

FIG. 5 shows an example construction of the file information table 500 stored in the file information storage unit 312 of the image forming apparatus 110.

The file information table 500 includes one or more records, which are collectively illustrated in FIG. 5. In each record, an image data file ID field (hereinafter, referred to as the file ID field) 501 stores an identifier that uniquely represents a corresponding one of image data files, which are managed by the image forming apparatus 110. The file ID field 501 is associated with an image data file ID field (hereinafter, referred to as the file ID field or the ID field) 608 of the job history information table 600.

A file name field 502 stores a file name of the image data file identified by the identifier in the file ID field 501. An update date and time field 503 stores information that represents a date and time at which the image data file identified by the identifier in the ID field 501 was registered or updated. A file size field 504 stores information that represents a file size of the image data file identified by the identifier in the ID field 501. A folder path field 505 stores an identifier that represents a folder in which the image data file identified by the identifier in the ID field 501 is stored or information about a full path to the folder.

An external public path field 506 stores a URI for accessing the image data file, which is identified by the identifier in the ID field 501, via the network 100 from the outside (e.g., from any of the user PCs 101 to 103 and the image forming apparatuses 111, 112). The external public path varies according to external public protocol (such as HTTP, FTP, SMB, or WebDAV) by which the image data file is published to the outside. For example, if SMB is used for external publication of the image data file, a URI such as "file://printer110/share/folder/sample.jpg" is stored in the external public path field 506. In a case where the image data file can be published to the outside using a plurality of external public protocols, a plurality of URIs are stored in the external public path field 506.

A storage source field 507 stores network address information that represents a storage source of the image data file identified by the identifier in the ID field 501 (i.e., a transmission source from which the image data file was transmitted to the image forming apparatus 110). In a case, for example, that the image data file is stored into the image forming apparatus 110 by a transmission job or a storage job of the image forming apparatus 111 via the file server function of the image forming apparatus 110, the storage source field 507 stores a network address (such as an IP address or a server name) that uniquely identifies the image forming apparatus 111.

In another case that the image data file is stored through the network 100 into the image forming apparatus 110 via the file server function of the apparatus 110 by the file copy from the user PC 101, the storage source field 507 stores a network address (such as an IP address) that uniquely identifies the user PC 101. Instill another case that the image data file is stored directly (not via the file server function) into the file information storage unit 312 by an MFP job of the image forming apparatus 110, the storage source field 507 remains empty.

An image data field 508 stores the image data file identified by the identifier in the ID field 501. When the image data file is stored into the image forming apparatus 110, the information stored in the external public path field 506 is notified by sending the URI notification to the user of the user PC 101, thereby enabling the user to easily access, via the network 100, the image data file stored in the image data field 508.

In this embodiment, an example has been described in which both image data files written from the outside through the network 100 via the file server function of the file server control unit 306 and image data registered by MFP jobs are managed by the same file information table 500.

However, to realize an image forming apparatus accessible as a file server from the outside and having a URI notification function of notifying an image data file being stored, image data files written from the outside via the file server function of the file server control unit 306 and image data registered by MFP jobs can be managed by different management units.

Referring to FIG. 3 again, the job information storage unit 313 registers pieces of information about MFP jobs (such as a print, scan job, transmission/reception job, and storage job) performed by the image forming apparatus 110. These pieces of information about MFP jobs include job IDs, job types, results, job execution times, user IDs, data sizes, and data destinations.

Figure 6:
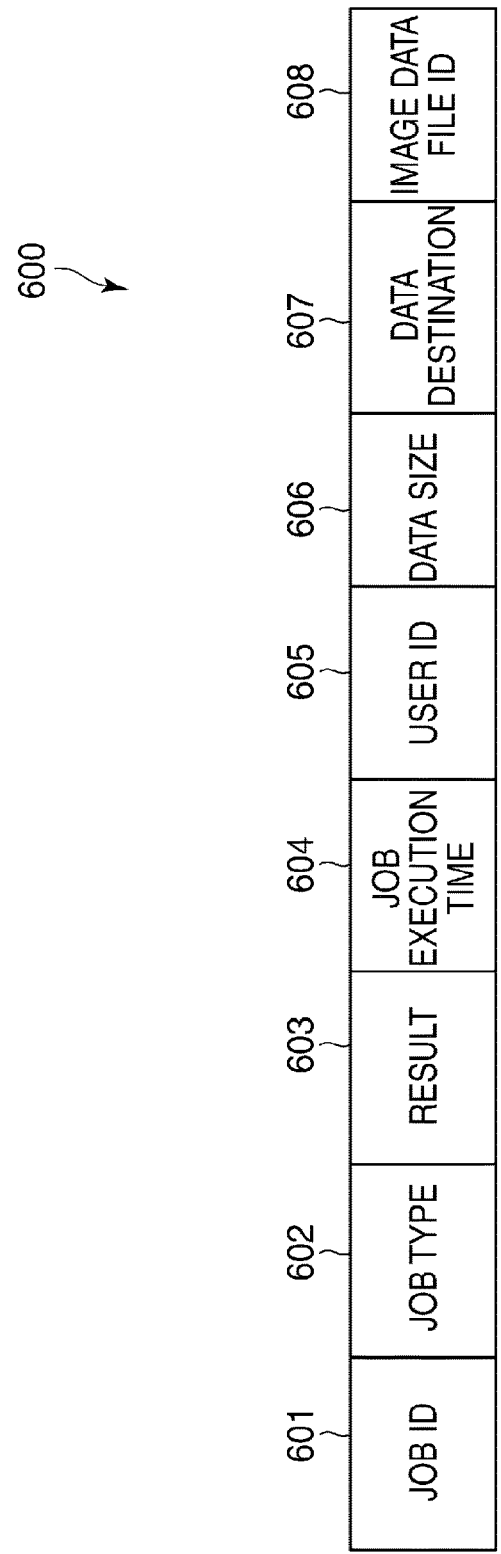
FIG. 6 is a view showing an example construction of a job history information table stored in the storage unit.

FIG. 6 shows an example construction of the job history information table 600 previously mentioned and stored in the job information storage unit 313.

The job history information table 600 includes one or more records, which are collectively illustrated in FIG. 6. In each record, a job ID field 601 stores an identifier that uniquely identifies an MFP job performed by the image forming apparatus 110. A job type field 602 stores information that represents the type of the MFP job such as a print job, scan job, transmission/reception job, or storage job. A result field 603 stores information that represents a result of the job performed by the image forming apparatus 110 (more specifically, a successful result or a faulty result and an end code representing an end state).

A job execution time field 604 stores information that represents a time at which the MFP job was performed. A user ID field 605 stores an identifier that identifies a user giving an instruction to execute the MFP job. A data size field 606 stores information that represents a data size of an image data file created when the MFP job (such as a transmission/reception job and a storage job) was performed by the image forming apparatus 110. A data destination field 607 stores information that represents a transmission destination or a storage destination of the image data file created by the MFP job.

An image data file ID field 608 stores an identifier that uniquely identifies the image data file created by the MFP job. The ID field 608 is associated with the ID field 501 of the file information table 500 (FIG. 5).

Figure 8A:
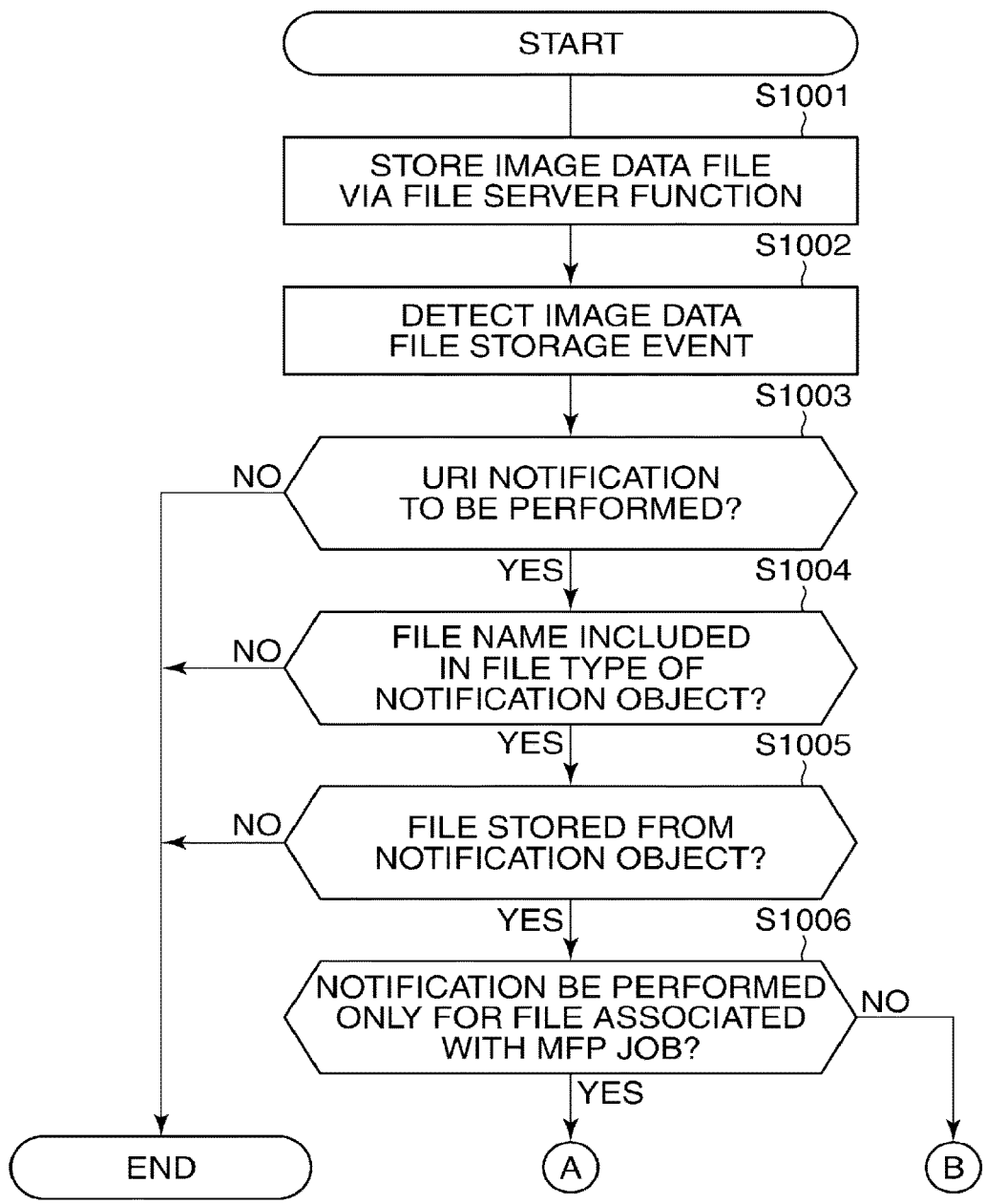
FIGS. 8A and 8B are a flowchart showing a URI notification process performed when an image data file is stored into the image forming apparatus via a file server function of the image forming apparatus.
Figure 8B:
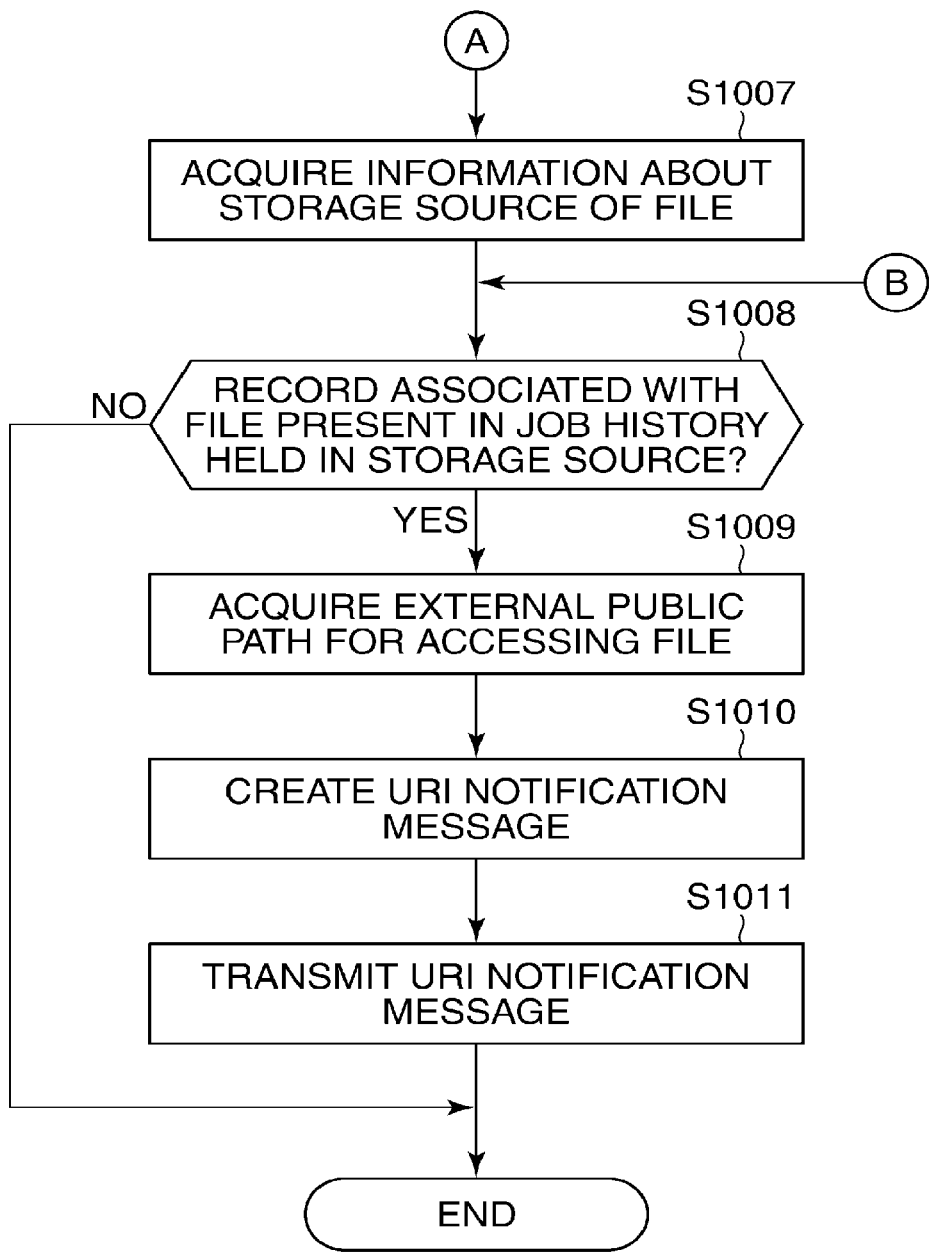

FIGS. 8A and 8B show in flowchart a URI notification process performed when an image data file is stored into the image forming apparatus 110 via the file server function of the apparatus 110.

In the URI notification process, the file server control unit 306 of the image forming apparatus 110 performs file server control according to protocol type (HTTP, FTP, SMB, Web-DAV, or the like). In the following example, it is assumed that SMB is used for external publication of image data file and the image data file is stored in an external public path "¥¥printer110¥share¥folder¥". The present process is executed by the CPU 201 of the image forming apparatus 110 by controlling the processing modules of the MFP controller 300 (FIG. 3).

Referring to FIGS. 8A and 8B, in step S1001, an image data file is stored into the image forming apparatus 110 through the network 100 from an external apparatus (any of the user PCs 101 to 103 and the image forming apparatuses 111, 112). The storage of the image data file from the external apparatus is achieved by the file server function, which is provided via the external interface 203 by control of the file server control unit 306 of the image forming apparatus 110. When the image data file is stored into the image forming apparatus 110, the file server control unit 306 acquires, via the external interface 203, a network address of a storage source (transmission source) of the image data file.

The file server control unit 306 cooperates with the file management unit 307 to store the image data file into the file information storage unit 312 of the storage unit 204. To this end, the file management unit 307 creates a new record corresponding to the image data file, and adds it to the file information table 500. Pieces of information are stored into the respective fields 501 to 508 of the new record. For example, the network address of the apparatus, which is the storage source (transmission source) of the image data file acquired by the file server control unit 306, is stored into the storage source field 507.

In step S1002, the storage detection unit 308 detects an image data file storage event performed in step S1001 by the file management unit 307, and acquires from the file information table 500 information about the record associated with the image data file.

In step S1003, the storage detection unit 308 searches for the URI notification setting table 400 in the URI notification setting storage unit 311, and acquires from the table 400 a record corresponding to the folder into which the image data file has been stored. Next, the storage detection unit 308 acquires information in the ON/OFF setting field 402 from the acquired record. If the information in the ON/OFF setting field 402 is ON (representing that URI notification should be performed), the flow proceeds to step S1004. If the information in the field 402 is OFF (representing that URI notification should not be performed), the present process is completed.

As previously described, the information in the ON/OFF setting field 402 is set by the user by operating either one of the URI notification ON/OFF selection buttons 7002 on the URI notification setting screen 700 (FIG. 7), and the set information is stored into the ON/OFF setting field 402 under the control of the operation control unit 304 and the URI notification setting unit 309.

In step S1004, the storage detection unit 308 acquires a file name in the file name field 502 of the record acquired in step S1002 from the file information table 500, and acquires information in the file type restriction field 409 of the record acquired in step S1003 from the URI notification setting table 400.

Next, the storage detection unit 308 determines whether the file name in the file name field 502 is included in the file type of URI notification object defined in the file type restriction field 409. If it is determined that the file name is included in the file type of URI notification object, the flow proceeds to step S1005. If it is determined that the file name is not included in such a file type, the present process is completed.

In a case, for example, that the file name of the stored image data file is "~WRL0795.tmp" and "*.tmp" is defined in the file type restriction field 409 as the file type of other than URI notification object, it is determined that that file is not a URI notification object, so that the URI notification is not performed. As previously described, the information in the file type restriction field 409 is set by the user on the URI notification exclusion file setting screen, which is displayed when the setting button 7008 on the URI notification setting screen 700 is depressed, and the set information is stored into the field 409 under the control of the operation control unit 304 and the URI notification setting unit 309.

In step S1005, the storage detection unit 308 acquires information in the storage source field 507 of the record acquired in step S1002 from the file information table 500. The storage detection unit 308 acquires information in the via server route exclusion field 406 and the storage source restriction field 407 of the record acquired in step S1003 from the URI notification setting table 400. If information "TRUE" is set in the via server route exclusion field 406, the storage detection unit 308 confirms whether the storage source field 507 is blank.

The storage detection unit 308 completes the present process, if the information "TRUE" is stored in the via server route exclusion field 406 (i.e., if the setting is such that the URI notification should not be performed in a case that the image data file has been stored via the file server) and if the storage source field 507 is not blank (i.e., if the image data file has been stored via the file server).

Next, the storage detection unit 308 determines whether the network address in the storage source field 507 of the record acquired from the table 500 coincides with any of network addresses of storage sources (transmission sources) which are defined as URI notification objects in the storage source restriction field 407 of the record acquired from the table 400. If it is determined that the image data file has been stored from any of the storage sources which are defined as URI notification objects, the flow proceeds to step S1006. If the image data file has been stored from a storage source defined as other than URI notification objects, the present process is completed.

In a case, for example, that a network address "123.0.0.103" of the user PC 103 is stored in the storage source field 507 and the network address "123.0.0.103" does not coincide with any of the storage source network addresses of URI notification objects in the storage source restriction field 407, the user PC 103 is determined as other than URI notification objects, so that the URI notification is not performed.

As previously described, the information in the via server route exclusion field 406 is set by the user by operating either one of the via file server route exclusion setting buttons 7005 on the URI notification setting screen 700, and stored into the field 406 under the control of the operation control unit 304 and the URI notification setting unit 309. The information in the storage source restriction field 407 is set by the user by operating either one of the storage source restriction setting buttons 7006 on the setting screen 700, and stored into the field 407 under the control of the units 304, 309.

In step S1006, the storage detection unit 308 acquires the information in the job restriction field 408 of the record acquired in step S1003 from the URI notification setting table 400. If the information in the field 408 is TRUE representing that the URI notification should be performed only when an image data file associated with an MFP job (such as a scan job or a transmission/reception job) is stored, the flow proceeds to step S1007. On the other hand, if the information in the job restriction field 408 is FALSE, the flow proceeds to step S1008. As previously described, the information in the field 408 is set by the user by depressing the job data restriction setting button 7007 on the setting screen 700, and stored into the field 408 under the control of the operation control unit 304 and the URI notification setting unit 309.

In step S1007, the storage detection unit 308 acquires pieces of information in the update date and time field 503, file size field 504, and storage source field 507 of the record acquired in step S1002 from the file information table 500. Next, the storage detection unit 308 establishes a connection via the network 100 with an apparatus having the network address registered in the storage source field 507. In step S1008, the storage detection unit 308 confirms whether the connection destination apparatus is any of the image forming apparatuses 110 to 112 and whether the apparatus holds the job history information table 600.

If the connection destination apparatus is other than the image forming apparatuses 110 to 112 or does not hold the job history table 600, the present process is completed. On the other hand, if the connection destination apparatus is any of the image forming apparatuses 110 to 112 and holds the job history information table 600, the storage detection unit 308 searches for the table 600.

Specifically, the storage detection unit 308 compares the values in the update date and time field 503 and the file size field 504 acquired in step S1007 with values in the job execution time field 604 and the data size field 606 of each of the records in the job history information table 600 of the connection destination apparatus (storage source apparatus), and determines whether a record coincident with the image data file is present in the job history information table 600. If there is such a record in the table 600, it is determined that the image data file was created by an MFP job in the image forming apparatus and is hence a URI notification object, and the flow proceeds to step S1009.

On the other hand, if a record coincident with the image data file is not present in the job history information table 600, it is determined that the image data file was not created by an MFP job in the image forming apparatus and is not a URI notification object, whereupon the present process is completed.

In step S1009, the storage detection unit 308 notifies the URI notification transmission unit 310 the fact that the image data file determined as a URI notification object in step S1008 has been stored into the file information storage unit 312, together with the information in the file ID field 501 of the corresponding record in the file information table 500. In response to this, the URI notification transmission unit 310 acquires from the file information table 500 pieces of information in the folder path field 505 and the external public path field 506 of the record represented by the information in the file ID 501.

In step S1010, the URI notification transmission unit 310 compares the value in the folder path field 505 acquired in step S1009 with a value in the folder ID field 401 of each record in the URI notification setting table 400 to search for the table 400 to find a folder into which the image data file has been stored, and acquires, from the folder found by the search, pieces of information in the notification destination field 403, notification method field 404, notification time field 405, and notification message field 410. Based on the acquired information in the notification destination field 403, notification method field 404, and notification message field 410 and the information in the external public path 506 acquired in step S1009, the URI notification transmission unit 310 creates a URI notification message.

In a case, for example, that the information in the notification method field 404 represents e-mail, a URI notification message is created in which an e-mail address (e.g., suzuki.ichiro@mail.com) stored in the notification destination field 403 is set as an e-mail destination into "To:" or "Cc:" and the information in the notification message field 410 and the external public path field 506 (e.g., ¥¥printer110¥share¥folder¥sample.jpg) are contained in an e-mail text body. As previously described, the information in the notification destination field 403 is set by the user on the notification destination input screen displayed when the URI notification setting button 7003 on the setting screen 700 is depressed, and stored into the field 410 under the control of the operation control unit 304 and the URI notification setting unit 309.

The information in the notification time field 405 is set by the user by depressing one of the URI notification time setting buttons 7004 on the screen 700 or set by the user on the specified time notification setting screen displayed when another of the buttons 7004 is depressed, and stored into the field 405 under the control of the units 304, 309. The information in the notification message field 410 is set by the user on the notification message detail setting screen displayed when the notification message setting button 7009 on the screen 700 is depressed, and stored into the field 405 under the control of the units 304, 309.

In step S1011, the URI notification transmission unit 310 transmits the URI notification message created in step S1010 to the destination specified in the notification destination field 403 by the notification method specified in the notification method field 404. In a case, for example, that e-mail is specified in the field 404, the URI notification message is transmitted by e-mail to the e-mail address (e.g., suzuki.ichiro@mail.com) specified in the field 403, and then the present process is completed.

If a notification time is specified in the notification time field 405, the URI notification message is transmitted to the notification destination by the transmission unit 310 when the specified notification time is reached. At that time, a plurality of URI notifications can collectively be transmitted to the same notification destination, where required.

The user can easily know the fact that the image data file has been stored into the image forming apparatus 110 by receiving the URI notification message by, e.g., an e-mail application running on the user PC 101. The user can easily access the image data file stored in the image forming apparatus 110 based on an external public path (e.g., ¥¥printer110¥share¥folder¥sample.jpg) contained in the URI notification message by using, e.g., a file browser application running on the PC 101.

As described in detail above, according to the above-described embodiment, the following effects can be attained. In an image forming apparatus having the file server function that enables access from the outside and the URI notification function of notifying the user that an image data file has been stored into the storage unit, a destination and a notification method for notification of an external public path that enables access from the outside are set beforehand, thereby making it possible to perform a notification to the set destination by the set notification method when it is detected that an image data file is stored into the storage unit of the image forming apparatus. By designating a notification condition in advance, a setting can be made so as not to notify the external public path even if storage of image data is detected.

This invention makes it possible to perform control to enable or disable the URI notification function for various data storage methods that can be achieved by the file management system of the image forming apparatus having the file server function. As a result, the URI notification function can be utilized according to the way in which the image forming apparatus having the file server function is used by a user.

Other Embodiment

Aspects of the present invention can also be realized by a computer of a system or apparatus (or devices such as a CPU or MPU) that reads out and executes a program recorded on a memory device to perform the functions of the above-described embodiment and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-290964, filed Dec. 22, 2009, which is hereby incorporated by reference herein in its entirety.

What is claimed is:

1. An information processing apparatus comprising:
a network interface configured to receive data from an external data source;
at least one controller having a processor that executes programs stored in a memory, or a circuitry having functions implemented therein,
the controller being configured to:
receive data through the network interface or data from an internal data source by using a loopback address and cause a storage to store the received data, and
send a storage destination of the stored data to a predetermined E-mail address in a case where the stored data has been received from the internal data source by using the lookback address,
wherein the storage destination of the stored data is not sent to the predetermined E-mail address in a case where the stored data has been received via the network interface from the external data source.

2. The information processing apparatus according to claim 1, wherein the information is an IP address.

3. The information processing apparatus according to claim 1, wherein the storage destination is a URI (Uniform Resource Identifier).

4. The information processing apparatus according to claim 1, wherein the controller notifies the storage destination according to a destination associated with a folder that is capable of being accessed from an external device.

5. The information processing apparatus according to claim 1, wherein the network interface is capable of communicating with a network according to a protocol of HTTP, FTP, SMB, or WebDAV.

6. The information processing apparatus according to claim 1, wherein the controller
accepts setting of one mode from among a plurality of modes, and
decides, based on the accepted setting of the one mode, whether or not it is allowed that the storage destination is notified to the predetermined E-mail address, in a case where the data transmitted from the internal data source is stored.

7. The information processing apparatus according to claim 1, wherein the controller
accepts setting of one mode from among a plurality of modes, and
decides, based on the accepted setting of the one mode, whether or not it is allowed that the storage destination is notified to the predetermined E-mail address, in a case where the data transmitted from an external device is stored.

8. The information processing apparatus according to claim 1, wherein the controller is configured to accept an instruction about notification-relevant setting by a folder.

9. The information processing apparatus according to claim 1, wherein the controller is configured to accept an instruction about an E-mail address setting by a folder.

10. The information processing apparatus according to claim 1, wherein the data is an image data.

11. The information processing apparatus according to claim 1, further comprising a scanner that scans an original, wherein the image data is a scanned data scanned by the scanner.

12. The information processing apparatus according to claim 1, wherein the information processing apparatus is capable of communicating with a first external device and a second external device as the external data source, and
the controller is configured to, in a case where data received, via the network interface, from the first external device as a registered external device, is stored in the storage, send the storage destination of the stored data to the predetermined E-mail address.

13. A method of controlling an information processing apparatus including a network interface configured to receive data from an external data source, the method comprising:
receiving data through the network interface or data from an internal data source by using a loopback address and cause a storage to store the received data, and
sending a storage destination of the stored data to a predetermined E-mail address in a case where the stored data has been received from the internal data source by using the lookback address, wherein the storage destination of the stored data is not sent to the predetermined E-mail address in a case where the stored data has been received via the network interface from the external data source.

\* \* \* \* \*